(12) United States Patent
Axelrad et al.

(10) Patent No.: US 8,865,281 B2
(45) Date of Patent: Oct. 21, 2014

(54) FLEXIBLE PIPES MADE OF A POLYARYLETHERKETONE/PERFLUORO-POLYMER COMPOSITION

(75) Inventors: Shari W. Axelrad, Atlanta, GA (US); Mohammad Jamal El-Hibri, Atlanta, GA (US); Brian A. Stern, Duluth, GA (US); Johan Billiet, Everbeek (BE); Brian Alexander, Brussels (BE)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 24 days.

(21) Appl. No.: 13/063,699

(22) PCT Filed: Sep. 18, 2009

(86) PCT No.: PCT/EP2009/062124
§ 371 (c)(1),
(2), (4) Date: Mar. 11, 2011

(87) PCT Pub. No.: WO2010/031844
PCT Pub. Date: Mar. 25, 2010

(65) Prior Publication Data
US 2011/0168288 A1    Jul. 14, 2011

Related U.S. Application Data

(60) Provisional application No. 61/098,291, filed on Sep. 19, 2008.

(51) Int. Cl.
*B32B 1/08*  (2006.01)
*C08L 27/12* (2006.01)
*C08L 71/00* (2006.01)
*C08L 27/00* (2006.01)

(52) U.S. Cl.
CPC ............... *C08L 71/00* (2013.01); *C08L 27/12* (2013.01); *C08L 27/00* (2013.01); *C08G 2650/40* (2013.01)
USPC .................................... 428/36.92; 525/133

(58) Field of Classification Search
USPC ............... 428/36.91, 36.9; 138/118; 525/133
See application file for complete search history.

(56) References Cited

U.S. PATENT DOCUMENTS

| | | | |
|---|---|---|---|
| 4,176,222 | A | 11/1979 | Cinderey et al. |
| 4,380,618 | A | 4/1983 | Khan et al. |
| 5,223,343 | A | 6/1993 | Tannenbaum |
| 5,601,893 | A | 2/1997 | Strassel et al. |
| 5,730,188 | A | 3/1998 | Kalman et al. |
| 6,566,484 | B2 | 5/2003 | Gharda et al. |

(Continued)

FOREIGN PATENT DOCUMENTS

| | | |
|---|---|---|
| CA | 847963 A | 7/1970 |
| EP | 1186819 A1 | 3/2002 |

(Continued)

*Primary Examiner* — Erik Kashnikow
(74) *Attorney, Agent, or Firm* — Oblon, Spivak, McClelland, Maier & Neustadt, L.L.P.

(57) ABSTRACT

Flexible pipe (fP) suitable for transporting hydrocarbons, said flexible pipe comprising at least one polymer layer (L) composed of a polymer composition (C) comprising at least one poly(aryl ether ketone) (P1), and at least one per(halo)fluoropolymer (P2). The poly(aryl ether ketone) (P1) and the per(halo)fluoropolymer (P2) are advantageously homogeneously distributed in the polymer composition (C). The polymer composition (C) is profitably prepared by a method comprising tumble blending the per(halo)fluoropolymer (P2) on one hand, and the poly(aryl ether ketone) (P1) or part of the poly(aryl ether ketone) (P1) on the other hand.

21 Claims, 3 Drawing Sheets

(56) References Cited

U.S. PATENT DOCUMENTS

| | | |
|---|---|---|
| 7,770,603 B2 | 8/2010 | Hardy |
| 2003/0130476 A1 | 7/2003 | Kemmish et al. |
| 2005/0121094 A1 | 6/2005 | Quigley et al. |
| 2006/0030681 A1 | 2/2006 | Sawyer et al. |
| 2006/0127622 A1 | 6/2006 | Mohan et al. |
| 2006/0229395 A1 | 10/2006 | Hsu et al. |
| 2007/0036925 A1* | 2/2007 | Braad .................. 428/36.9 |

FOREIGN PATENT DOCUMENTS

| | | |
|---|---|---|
| EP | 1741549 A1 | 1/2007 |
| GB | 1443225 A | 7/1976 |
| GB | 2330394 A | 4/1999 |
| JP | 05116233 A | 5/1993 |
| WO | WO 9967561 A1 | 12/1999 |
| WO | WO 2005030836 A1 | 4/2005 |
| WO | WO 2005103139 A1 | 11/2005 |
| WO | WO 2006059220 A2 | 6/2006 |
| WO | WO 2006120320 A1 | 11/2006 |
| WO | WO 2008094698 A1 | 8/2008 |
| WO | WO 2008113362 A1 | 9/2008 |
| WO | WO 2008119676 A1 | 10/2008 |
| WO | WO 2008119677 A1 | 10/2008 |
| WO | WO 2008125807 A1 | 10/2008 |

* cited by examiner

FLEXIBLE PIPES MADE OF A POLYARYLETHERKETONE/PERFLUORO-POLYMER COMPOSITION

CROSS REFERENCE TO RELATED APPLICATIONS

This application is a U.S. national stage entry under 35 U.S.C. §371 of International Application No. PCT/EP2009/062124 filed Sep. 18, 2009, which claims priority to U.S. provisional application 61/098,291, filed Sep. 19, 2009, the whole content of which is herein incorporated by reference for all purposes.

FIELD OF THE INVENTION

The present invention relates to a new flexible pipe comprising at least one layer made of a particular polymer composition.

BACKGROUND OF THE INVENTION

Many factors such as politics and oil prices have contributed to an increase in deep offshore oil exploration of depths up to 3000 m. New technology such as floating production storage and offloading (FPSO) platforms and subsea production wells has enabled efficient deepwater offshore exploration. This technology necessitates the use of flexible risers, umbilicals, control lines, and other flexible pipes. Flexible pipes offer mobility and flexibility from the standpoint of designing systems. Flexible pipes are suitable for carrying process chemicals back and forth from the bottom of the ocean and subsea wells to floating platforms at sea level. Their length may range from about 1500 to about 3000 m long. Flexible pipes are also suitable for transporting other fluids than crude oil, including hydrocarbon liquids and gases, such as natural gas. In fact, flexible pipes can be useful for transporting virtually any fluid in any environment, including when the fluid to be transported and/or the environment where to transport it, is chemically aggressive.

Flexibility is a distinctive property of a flexible pipe. A typical 8" internal diameter flexible pipe should desirably bend to a radius of about 2 m or even less. This flexibility is important notably for floating production systems, and also for flowlines laid on difficult seabed conditions; flexibility makes it further possible to spool the pipe on a reel or in a carousel for efficient and quick transportation and installation. Yet, flexible pipes must also be strong enough to survive stresses imparted by waves, currents, and tides as well as severe pressures and sharp temperature fluctuations.

Flexible pipes are generally made up of several layers arranged in a modular construction, i.e. at least some of the pipe layers are independent from each other; desirably, all the pipe layers are independent from each other. Such independent, un-bonded layers are to a certain extent able to move relative to one another so as to allow the pipe to bend. They have also the additional advantage that they can be made fit-for-purpose and independently adjusted to best meet a field development requirement.

Flexible pipes include generally corrosion-resistant steel wires as main usual components. The steel wires are generally helically wound, so as to give the structure its high pressure resistance and excellent bending characteristics, thus providing flexibility and superior dynamic behavior. The wound steel wires are desirably insulated from each other by intermediate polymer abrasion layers.

Precisely, polymer layers are other usual main components of flexible pipes. In addition to their possible highly beneficial use as antiwear sheaths, polymer layers are also useful as leakproof barriers. The outermost layer of a flexible pipe may advantageously be made of a polymer leakproof barrier, which prevents the external environment medium (such as sea water, when drilling offshore) from penetrating inside the flexible pipe structure. At the opposite, the innermost layer of a flexible pipe may also advantageously be made of a polymer leakproof barrier, which prevents the transported fluid (such as crude oil or natural gas, e.g. when drilling offshore), from moving towards the more outer layer(s) of the flexible pipes.

Prior art flexible pipes the design of which are well adapted for offshore exploration are described in the standardized documents published by the American Petroleum Institute (API), and especially documents API 17J and API RP 17B. This type of pipe comprises successive layers, independent of one another, including, on the one hand, helical windings of profiled wires and/or tapes and, on the other hand, at least one sheath made of a polymeric material. Whereas the function of the metal layers is to take up the mechanical forces, both internal and external, the function of the polymeric sheaths is to provide internal or external sealing. The various layers are to a certain extent able to move relative to one another so as to allow the pipe to bend. Various structures exist for such pipes, however they all generally have a multilayer assembly called a pressure vault that is intended to take up the radial forces and a multilayer assembly intended to take up the axial forces. The pressure vault located toward the interior of the pipe generally consists of a short-pitch helical winding of a profiled wire, while the layers intended to take up the axial forces, located toward the outside of the pipe, generally consist of a pair of cross plies of armor wires wound helically with a long pitch. In addition, to prevent at least two of these armor plies coming directly into contact with one another, which would result in their premature wear, a relatively thin intermediate layer of plastic is interposed. Flexible pipes equipped with antiwear layers are described in U.S. Pat. No. 5,730,188 (to Wellstream, Inc.) and WO 2006/120320 (to Technip France), the whole content of both patent titles being herein incorporated by reference. The reader may refer to FIG. 1 of US' 188, wherein polymer layers 14 and 16 are used as antiwear sheaths of a flexible pipe; the same pipe includes also a polymer layer 12, which acts as overlying fluid barrier. The reader may also refer to FIG. 1 of Technip's PCT application: a flexible pipe, with a design pretty close to that of Wellstream's one, includes anti-wear plastic layers 22 and 24, as well as a pressure sheath 8 and a covering layer 10, the pressure sheath 8 and the covering layer 10 being also possibly made of polymer.

Whatever their location and function in the flexible pipe multilayer assembly, the polymer layers need to comply with multiple harsh requirements, including high compressive strength, high temperature resistance, hydrolytic stability at high temperatures, toughness and ductility for winding, environmental stress cracking resistance and abrasion resistance.

When a polymer layer is used as the innermost layer of a flexible pipe, it is subject to chemical attack by the transported fluid, especially in the hot underground environment in which down-hole pipes convey oil from deeply buried deposits to the earth surface. Should the transported fluid be oil, the sulfur, sulfur dioxide and carbon dioxide present in the oil typically make it acidic causing corrosion of the interior surface of the pipe. The innermost layer of a flexible pipe may also be abraded by materials insoluble in the oil, including materials which are soluble in the oil at high temperatures of the oil deposit but become insoluble as the oil cools during the rise through the pipe to the earth surface; among such resultant insoluble materials, it can be cited asphaltenes, paraffin waxes and "scale" which generally includes calcite and/or barite. Further, to avoid plugging by these materials, it may be necessary to clean out the internal surface of the pipe by mechanical scrapping (pigging), chemical or hot oiling treatment, which by its aggressive nature, requires the innermost layer to exhibit a high chemical and abrasion resistance.

When a polymer layer is used as the outermost layer of a flexible pipe, this one may also be corroded by the external environment medium. Typically, when drilling offshore, it may be corroded by sea water. Such water may contain carbonic or hydrochloric acid, and occasionally oil and gas may contain small amounts of corrosive gases such as carbon dioxide and hydrogen sulfide. When either of these gases are dissolved in water, acid is created that may attack the surface of the pipe, causing its possible failure. Further, typical oil well operations include running flexible pipes down hole with appropriate tools; the repeated spooling may cause fatigue and wear damage that can suddenly cause the outermost layer to fracture and fail.

Intermediate polymer layers, in particular antiwear polymer layers, tend to deteriorate particularly rapidly when the flexible pipes of which they are made up are subjected to severe stresses, such as those encountered when extracting certain subsea oil deposits, located at great depth, and where the hydrocarbon is at a high temperature of around 130° C.; under such conditions, these ones layers may endure temperatures of around 110° C. and contact pressures (compressive stresses) of about 300 to 400 bar. In addition to being subjected to severe stresses, intermediate polymer layers, in particular antiwear layers, have to withstand abrasion and friction at an extremely high degree of intensity, typically much higher than that endorsed by the other layers. Further, intermediate polymer layers further be subject to chemical attack resulting from local contacts with chemical agents of the same nature as those with which the innermost and/or the outermost layers are in direct contact. Finally, one or more faces of the intermediate polymer layers, in particular of antiwear layers, may be locally or completely covered by a lubricant, such as some kind of grease, to reduce somehow the wear intensity caused by the metal armor plies, and make it easier their relative motion with regard to the same.

Various polymers have already been proposed as the main component of a polymer layer of a flexible pipe, including polyolefins, polyurethanes, polyethers, poly(vinylidene fluoride)s, polyamides, poly(amide imide)s, polyimides, poly(ether imides), polyphenylene sulfides, wholly aromatic polyesters, poly(aryl ether sulfone)s and poly(aryl ether ketone)s. The reader may notably refer to US 2005/0121094, US 2006/0127622 (to Du Pont), U.S. Pat. No. 5,601,893 (to Elf Atochem), GB 1 443 225 and GB 2 330 394 (to the Institut Francais du Petrole), EP 1 186 819 (to ABB Research Ltd.), EP 1 741 549 (to UBE), WO 99/67561 (to ABB Offshore Technology) and WO 05/103139 (to Exxon Mobil Chemical), the whole content of all these patent titles being herein incorporated by reference.

However, there is a still a strong need for a flexible pipe comprising one or more polymer layer(s) made up of a polymer material, including but not limited to intermediate antiwear layers, wherein the said polymer material would exhibit an improved overall balance of properties, including a high compressive strength, a high temperature resistance, a high hydrolytic stability at high temperatures, a high toughness and ductility for winding, a high environmental stress rupture resistance and a high abrasion resistance, all this at a lower cost than that of a high performance semi-crystalline polymer like PEEK, and which would further be well-adapted to processing by extrusion in long tape form. In particular, the said polymer layer(s) should exhibit an environmental stress rupture resistance and an abrasion resistance close to those exhibited by polymer layers made up of high performance semi-crystalline polymers like PEEK, but at a lower cost and with a good long tape extrudability. Desirably, the said polymer layer(s) should exhibit at least substantially the same environmental stress rupture resistance and abrasion resistance as those exhibited by polymer layers made up of PEEK, but at a more attractive cost and with a good long tape extrudability.

The Invention

This need, and still other ones, are met by a flexible pipe (fP) suitable for transporting hydrocarbons, said flexible pipe comprising at least one polymer layer (L) composed of a polymer composition (C) comprising:
  at least one poly(aryl ether ketone) (P1), and
  at least one per(halo)fluoropolymer (P2), and
  optionally at least one polyarylene (P3), and
  optionally at least one poly(aryl ether sulfone) (P4),
wherein, if polyarylene (P3) is present, the total weight of the poly(aryl ether ketone) (P1), based on the total weight of the polymer composition (C) is above 50%, and wherein, if poly (aryl ether sulfone) (P4) is present, the total weight of the poly(aryl ether sulfone) (P4) over the total weight of the poly(aryl ether ketone) (P1) ratio is below 1.

According to another aspect, the invention provides a method for producing the flexible pipe (fP) as above defined, wherein the polymer composition (C) is extruded, thereby simplifying its processing and in particular allowing long thin sheets to be formed.

BRIEF DESCRIPTION OF THE DRAWINGS

For a detailed description of the invention, reference will now be made to the accompanying drawings in which.

DETAILED DESCRIPTION OF THE INVENTION

A particular embodiment of the present invention may sometimes be preferred. Such embodiment is related to a flexible pipe comprising at least one polymer layer (L) composed of a polymer composition (C) comprising:
  at least one poly(aryl ether ketone) (P1), and
  at least one per(halo)fluoropolymer (P2),
wherein the polymer composition (C) is essentially free of any polyarylene and poly(aryl ether sulfone). It may even be preferred that said polymer composition (C) be completely free of any polyarylene and poly(aryl ether sulfone).

Another particular embodiment of the present invention may sometimes be preferred. Such embodiment is related to a flexible pipe comprising at least one polymer layer (L) composed of a polymer composition (C) comprising:
- at least one poly(aryl ether ketone) (P1), and
- at least one per(halo)fluoropolymer (P2), wherein the total weight of the poly(aryl ether ketone) (P1) and the per(halo)fluoropolymer (P2), based on the total weight of the polymer composition (C) is above 50%, and wherein the total weight of the poly(aryl ether ketone) (P1) over the total weight of the per(halo)fluoropolymer (P2) is above 1.

The proportions of the different polymers (P1) to (P4) present in the polymer composition (C), which are independently applicable to any one of the above described flexible pipes according to the present invention, are detailed hereafter.

The total weight of the poly(aryl ether ketone) (P1), based on the total weight of the poly(aryl ether ketone) (P1) and the per(halo)fluoropolymer (P2), may be of at least 35, 40, or 50%; it is preferably above 60%, more preferably above 65%, still more preferably above 70%, possibly of at least 80% or of at least 85%. On the other hand, the total weight of the poly(aryl ether ketone) (P1), based on the total weight of the poly(aryl ether ketone) (P1) and the per(halo)fluoropolymer (P2), may be of at most 99, 97 or 95%, preferably at most 90%.

The total weight of the poly(aryl ether ketone) (P1) and the per(halo)fluoropolymer (P2), based on the total weight of the polymer composition (C), is advantageously above 35%, preferably above 55%, more preferably above 65%, and still more preferably above 75%. In certain embodiments, the total weight of the poly(aryl ether ketone) (P1) and the per(halo)fluoropolymer (P2), based on the total weight of the polymer composition (C), may be above 80%, 90% or 95%. In a certain particular embodiment to which the preference may sometimes be given, the polymer composition (C) consists essentially of, or even consists of, the poly(aryl ether ketone) (P1) and the per(halo)fluoropolymer (P2).

The total weight of the poly(aryl ether ketone) (P1), based on the total weight of the polymer composition (C), is advantageously above 55%, preferably above 60%, more preferably above 65%, and still more preferably above 70%. On the other hand, the total weight of the poly(aryl ether ketone) (P1), based on the total weight of the polymer composition (C), is advantageously below 99%, preferably below 97%, and more preferably below 95%.

The total weight of the per(halo)fluoropolymer (P2), based on the total weight of the polymer composition (C), is advantageously above 1%, preferably above 3%, and more preferably above 5%. On the other hand, the total weight of the per(halo)fluoropolymer (P2), based on the total weight of the polymer composition (C), is advantageously below 35%, preferably below 30%, more preferably below 20% and still more preferably below 15%.

The polymer composition may contain other ingredients, different from the poly(aryl ether ketone) (P1) and the per(halo)fluoropolymer (P2). It may for example also contain at least one polyarylene (P3) and/or at least one poly(aryl ether sulfone) (P4).

When polyarylene (P3) is present, the total weight of the poly(aryl ether ketone) (P1), based on the total weight of the polymer composition (C) is above 50%, preferably above 60%, more preferably above 70% and still more preferably above 80%. The total weight of the polyarylene (P3), based on the total weight of the polymer composition (C), may advantageously be of above 1%, preferably above 3%, and more preferably above 5%. On the other hand, the total weight of the polyarylene (P3), based on the total weight of the polymer composition (C), may advantageously be below 35%, preferably below 30%, more preferably below 20% and still more preferably below 15. In a certain particular embodiment to which the preference may sometimes be given, the polymer composition (C) is essentially free, or completely free of any polyarylene (P3).

When poly(aryl ether sulfone) (P4) is present, the total weight of the poly(aryl ether sulfone) over the total weight of the poly(aryl ether ketone) (P1) is below 1, preferably below 0.8, more preferably below 0.6 and more preferably below 0.4. The total weight of the poly(aryl ether sulfone) (P4), based on the total weight of the polymer composition (C), may advantageously be of above 1%, preferably above 3%, and more preferably above 5%. On the other hand, the total weight of the poly(aryl ether sulfone) (P4), based on the total weight of the polymer composition (C), may advantageously be below 35%, preferably below 30%, more preferably below 20% and still more preferably below 15. In a certain particular embodiment to which the preference may sometimes be given, the polymer composition (C) is essentially free, or completely free of any poly(aryl ether sulfone).

The poly(aryl ether ketone) (P1)

As previously mentioned, the polymer composition (C) contains at least one poly(aryl ether ketone) (P1).

For the purpose of the present invention, the term "poly(aryl ether ketone)" is intended to denote any polymer, generally a polycondensate, of which more than 50 wt. % of the recurring units are recurring units (R1) of one or more formulae containing at least one arylene group, at least one ether group (—O—) and at least one ketone group [—C(=O)—], the said one formulae being free of sulfone group [—S(=O)$_2$—].

Preferably, recurring units (R1) are chosen from:

(I)

(II)

-continued (III)

(IV)

(V)

wherein:
 Ar is independently a divalent aromatic radical selected from phenylene, biphenylene or naphthylene,
 X is independently O, C(=O) or a direct bond,
 n is an integer of from 0 to 3,
 b, c, d and e are 0 or 1,
 a is an integer of 1 to 4, and
 preferably, d is 0 when b is 1.

More preferably, recurring units (R1) are chosen from:

(VI)

(VII)

(VIII)

(IX)

(X)

(XI)

(XII)

(XIII)

(XIV)

(XV)

(XVI)

(XVII)

Still more preferably, recurring (R1) are chosen from:

Most preferably, recurring units (R1) are:

(VII)

For the purpose of the present invention, a polyetheretherketone is intended to denote any polymer of which more than 50 wt. % of the recurring units are recurring units (R1) of formula (VII).

The poly(aryl ether ketone) (P1) may be notably a homopolymer; it may also be a random, alternating or block copolymer. When the poly(aryl ether ketone) (P1) is a copolymer, it may notably contain (i) recurring units (R1) of at least two different formulae chosen from formulae (VI) to (XXI), or (ii) recurring units (R1) of one or more formulae (VI) to (XXI) and recurring units (R1*) different from recurring units (R1).

Preferably more than 70 wt. %, more preferably more than 85 wt. % of the recurring units of the poly(aryl ether ketone) (P1) are recurring units (R1). Still more preferably, essentially all the recurring units of the poly(aryl ether ketone) (P1) are recurring units (R1). Most preferably, all the recurring units of the poly(aryl ether ketone) (P1) are recurring units (R1).

Excellent results were obtained when the poly(aryl ether ketone) (P1) was a polyetheretherketone homopolymer, i.e. a polymer of which essentially all, if not all, the recurring units are of formula (VII).

The poly(aryl ether ketone) (P1) has a reduced viscosity (RV) of advantageously at least 0.55 dl/g, preferably of at least 0.70 dl/g and more preferably of at least 1.05 dl/g; besides, the RV of the poly(aryl ether ketone) (P1) is advantageously of at most 1.50 dl/g and preferably of at most 1.35 dl/g and more preferably of at most 1.25 dl/g. The reduced viscosity (RV) is measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution, to limit sulfonation.

The poly(aryl ether ketone) (P1) can be prepared by any method.

One well known in the art method comprises reacting a substantially equimolar mixture of at least one bisphenol and at least one dihalobenzoid compound or at least one halophenol compound as described in Canadian Pat. No. 847,963. Preferred bisphenols in such a process are hydroquinone, 4,4'-dihydroxybiphenyl and 4,4'-dihydroxybenzophenone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222, the whole content of which is herein incorporated by reference.

Another well known in the art method to produce PEEK homopolymers comprises electrophilically polymerizing phenoxyphenoxybenzoic acid or the like, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

Poly(aryl ether ketone)s, including polyetheretherketones, are commercially available as KETASPIRE® and GATONE® from SOLVAY ADVANCED POLYMERS, L.L.C.; they are also commercialized notably by VICTREX.

The per(halo)fluoropolymer (P2)

As previously mentioned, the polymer composition (C) contains at least one per(halo)fluoropolymer (P2).

For the purpose of the invention, a per(halo)fluoropolymer material is intended to denote one or more per(halo)fluoropolymers, i.e. one or more polyaddition polymers of which at least 98.0 wt. % of the recurring units are derived from at least one per(halo)fluoromonomer.

For the purpose of the invention, a per(halo)fluoromonomer is intended to denote any ethylenically unsaturated monomer comprising at least two carbon atoms and at least one fluorine atom, and which is free of hydrogen atom directly linked to a carbon atom (i.e. linked to a carbon atom through a single bond C—H).

The per(halo)fluoromonomer may further comprise, in addition to the carbon and the fluorine atom(s), at least one halogen atom other than fluorine; thus, the per(halo)fluoromonomer may further comprise at least one chlorine atom, and/or at least one bromine atom, and/or at least one iodine atom. Alternatively, the per(halo)fluoromonomer may be free of halogen atom other than fluorine; when this condition is met, the per(halo)fluoromonomer is herein called "perfluoromonomer".

The per(halo)fluoromonomer may also further comprise at least one heteroatom other than a halogen atom; in particular, it may further comprise at least one oxygen atom, phosphorus atom and/or nitrogen atom.

The per(halo)fluoromonomer may also further comprise at least one hydrogen atom linked to a heteroatom; in particular, it may further at least one hydrogen atom linked to an oxygen atom, a phosphorus atom or a nitrogen atom. The case being, the hydrogen atom and the heteroatom form part of a functional group such as —OH, —NH$_2$, —C(=O)OH, —C(=O)NH$_2$, —SO$_3$H, —SO$_2$H, —PO$_3$H$_2$ or —PO$_2$H$_2$. Yet, it is preferred that per(halo)fluoromonomer be free of any hydrogen atom.

The per(halo)fluoropolymer may be free of recurring units derived from at least one monomer other than a per(halo)fluoromonomer. Alternatively, the per(halo)fluoropolymer may further comprise up to 2.0 wt. % of recurring units derived from at least one ethylenically unsaturated monomer other than a per(halo)fluoromonomer.

As examples of ethylenically unsaturated monomers other than per(halo)fluoromonomers, it can be notably cited:
  ethylene, propylene and C$_4$-C$_{12}$ mono-olefins,
  non fluorinated perhalogenated mono-olefins such as tetrabromoethylene and hexabromopropylene,
  partially fluorinated mono-olefins such as vinylidene fluoride and trifluoroethylene, and
  partially halogenated, non fluorinated mono-olefins such as vinylidene chloride.

The per(halo)fluoropolymer may notably be a homopolymer, a random, alternating or block copolymer.

Preferably, the per(halo)fluoropolymer (P2) is a polytetrafluoroethylene.

For the purpose of the present invention, a polytetrafluoroethylene is intended to denote any per(halo)fluoropolymer (as above defined) of which more than 98.0 wt. % of the recurring units are derived from tetrafluoroethylene. Preferably more than 98.5 wt. %, more preferably more than 99.0 wt. % and still more preferably more than 99.5 wt. % of the recurring units of the polytetrafluoroethylene may be derived from tetrafluoroethylene.

In a certain embodiment, to which the preference may be given, essentially all the recurring units (or even, all the recurring units) of the polytetrafluoroethylene are derived from tetrafluoroethylene; the polytetrafluoroethylene may then be qualified as a "homopolymer".

In another embodiment, to which the preference may also be given, between 0% and 2 wt. % of the recurring units of the polytetrafluoroethylene are derived from one or more ethylenically unsaturated monomer(s) other than polytetrafluoroethylene. In said other embodiment, preferably between 0% and 0.5 wt. % of the recurring units of the polytetrafluoroethylene are derived from one or more ethylenically unsaturated monomer(s) other than polytetrafluoroethylene. Said other ethylenically unsaturated monomer(s) may be any of the per(halo)fluoromonomers other than polytetrafluoroethylene previously cited in the present document, and/or ethylene, and/or propylene, and/or any C$_4$-C$_{12}$ mono-olefin, and/or any non fluorinated, perhalogenated mono-olefin, and/or any partially fluorinated mono-olefin and/or any non fluorinated, partially halogenated mono-olefin; said other ethylenically unsaturated monomer(s) is (are) preferably any of the per(halo)fluoromonomers other than polytetrafluoroethylene previously cited in the present document; further, all the preferences expressed here below concerning the nature of the at least one per(halo)fluoromonomer from which the recurring units (R3) are derived, apply, mutatis mutandis, to the presently concerned other ethylenically unsaturated monomer(s) when these ones are also per(halo)fluoromonomers.

The polytetrafluoroethylene of the present invention is advantageously selected from the group of the so-known "non fibrillating polytetrafluoroethylenes", also commonly referred to as "low molecular weight polytetrafluoroethylenes" or "low melt viscosity polytetrafluoroethylenes". The case being, it has preferably the thermal stability, chemical inertness, lubricity, and high melting temperature substantially identical to those of high molecular weight polytetrafluoroethylenes having typically a number average molecular weight of above 2,000,000.

The polytetrafluoroethylene of the present invention has a number average molecular weight of advantageously below 1,000,000, preferably below 700,000, and more preferably below 500,000. On the other hand, it has a number average molecular weight of advantageously above 50,000. The number average molecular weight of the polytetrafluoroethylene is generally calculated by measuring the total amount N$_g$ (expressed in moles/kg) of the polytetrafluoroethylene end groups —CF$_2$COOH and —CF$_2$COF, determined by FT-IR spectroscopy. The number average molecular weight (M$_n$) is calculated by means of the following formula M$_n$=2 000/N$_g$. Gel Permeation Chromatography (GPC) may also be used.

The polytetrafluoroethylene of the present invention has advantageously a melt viscosity of below 10$^4$ Pa·s, as measured at 372° C. in accordance with the procedure ASTM D1239-52T modified as described in U.S. Pat. No. 4,380,618, the whole content of ASTM D1239-52T and of U.S. Pat. No. 4,380,618 being herein incorporated by reference.

The polytetrafluoroethylene may be obtained directly by polymerization technique such as described in example 1 of U.S. Pat. No. 5,223,343, the whole content of which is herein incorporated by reference.

Alternatively, the polytetrafluoroethylene may be obtained from a powder of a polytetrafluoroethylene having a higher number average molecular weight (hereinafter, the "higher molecular weight polytetrafluoroethylene"), by irradiating said powder with an efficient amount of gamma rays and/or electron beam, so as to decrease the number average molecular weight of the higher molecular weight polytetrafluoroethylene down to a value below 1,000,000, preferably below 700,000, and more preferably below 500,000, thereby obtaining an irradiated powder of the polytetrafluoroethylene as above specified. The higher number average molecular weight polytetrafluoroethylene has typically a number average molecular weight of above 2,000,000, and it is typically polymerized by an emulsion or a suspension polymerization process. With the emulsion polymerization process, a latex comprising essentially spherical sub-micronic particles of the higher number average molecular weight polytetrafluoroethylene, emulsified in a dispersion medium (typically, water) is generally obtained. After coagulation of the sub-micronic particles, a powder composed of particles having a volume weighted mean diameter D(4,3) of from 100 µm to 500 µm micron, as measured by dynamic light scattering (DLS) using a conventional DLS equipment (such as MALVERN Mastersizer 2000), is generally obtained. Said powder of the higher number average molecular weight polytetrafluoroethylene is then in general irradiated with gamma rays, thereby obtaining an irradiated powder of low molecular weight polytetrafluoroethylene. The irradiated powder of the low molecular weight polytetrafluoroethylene is then milled to obtain finely divided solids as detailed below.

With the suspension polymerization process, a powder composed of particles having a volume weighted mean diameter D(4,3) of from 1.0 mm to 10.0 mm, as measured by DLS using a conventional DLS equipment (such as MALVERN Mastersizer 2000), is generally obtained. Said powders are general irradiated with electron beam, thereby obtaining an irradiated powder of low molecular weight polytetrafluoroethylene. The irradiated powder of the low molecular weight polytetrafluoroethylene is then milled to obtain finely divided solids as detailed below.

The polytetrafluoroethylene is advantageously in the form of finely divided solids, and is then commonly referred to as "PTFE micropowder". The finely divided solids have a volume weighted mean diameter D(4,3) of preferably less than 100 µm, more preferably less than 20 µm, still more preferably less than 15 µm, and most preferably less than 10 µm as measured by DLS using a conventional DLS equipment (such as MALVERN Mastersizer 2000).

The polytetrafluoroethylene has preferably thermal stability, chemical inertness, lubricity, and high melting temperature similar to high molecular weight polytetrafluoroethylenes.

The polytetrafluoroethylene of the present invention is advantageously non-melt-processable. For the purpose of the present invention, the term "non-melt-processable" means that the polytetrafluoroethylene cannot be readily processed (i.e. fabricated into shaped articles such as films, fibers, tubes, wire coatings and the like) by conventional melt extruding, injecting or casting means. The non-melt-processability of the polytetrafluoroethylene is generally related with its quite high dynamic viscosity, measured at a shear rate of 1 s$^{-1}$ and at a temperature which exceeds its melting point of roughly 30° C. [preferably, at a temperature equal to the melting point of the polytetrafluoroethylene+(30±2° C.)], with a controlled strain rheometer: that high dynamic viscosity is typically of at least 10$^6$ Pa·s. As well know by the skilled person, polytetrafluoroethylene has generally no easily discernible melting point; its notional melting point, measured by DSC at a heating rate of 10° C./min (ASTM D 3418) is generally of about 328° C., and polytetrafluoroethylene starts generally to decompose at about 400° C.; even at such a high temperature, polytetrafluoroethylene remains generally in a rigid gel-like state, which prevents it from being readily processed by conventional melt extruding, injecting or casting means.

ALGOFLON® L 206 and L 203 PTFE and POLYMIST® non fibrillating polytetrafluoroethylenes, available from Solvay Solexis, S.p.A., are especially suitable for use as the polytetrafluoroethylene. Other especially suitable non fibrillating polytetrafluoroethylenes are commercially available notably from DuPont as ZONYL® (e.g. ZONYL® MP1600), and from Daikin Industries, Ltd. as LUBLON® (e.g. LUBLON® L-5).

The polyarylene (P3)

Polyarylenes have been described in EP2008/053383, the whole content of which is herein incorporated.

For the purpose of the present invention, a polyarylene (P3) is intended to denote any polymer of which more than 50 wt. % of the recurring units are recurring units (R3) of one or more formulae consisting of an optionally substituted arylene group, provided said optionally substituted arylene group is linked by each of its two ends to two other optionally substituted arylene groups via a direct C—C linkage.

The poly(aryl ether sulfone) (P4)

Poly(aryl ether sulfone)s have been described in EP2008/053391, the whole content of which is herein incorporated.

For the purpose of the invention, a poly(aryl ether sulfone) (P4) is intended to denote any polymer, generally a polycondensate, of which more than 50 wt. % of the recurring units are recurring units (R4) of one or more formulae containing at least one arylene group, at least one and at least one ether group (—O—) and at least one sulfone group [—S(=O)$_2$—].

Optional Ingredients of the Polymer Composition (C)

Although the polymer composition (C) contains a high amount of poly(aryl ether ketone) (P1), the layer (L) of which the polymer composition (C) is made up, has surprisingly a very good deformation-under-load capability. Thus, the polymer composition (C) needs not to further incorporate an additive, such as a fiber, to the purpose of increasing its deformation-under-load capabilities. Accordingly, the polymer composition (C) may be free of fiber (F).

Yet, the polymer composition (C) may contain at least one fiber (F), generally in a low amount, essentially to another purpose than that of increasing the deformation-under-load capability of the layer (L). For example, a generally low amount of fiber (F) can be used advantageously to increase the friction and wear resistance of the polymer composition (C). As used herein, a low amount of fiber (F) means generally at most 10% or 7%, based on the total weight of the polymer composition (C); amounts of fiber (F) of least 1%, 2%, 3% or 5%, based on the total weight of the polymer composition (C), have proved to be efficient to increase substantially the friction and wear resistance of the polymer composition (C).

In rather rare instances when extremely high deformation-under-load capabilities are required, a higher amount of fiber (F) may be incorporated to the composition. This higher weight amount does not generally exceed 30%. Total weight amounts of fiber (F) above 10%, up to 30%, based on the total weight of the polymer composition (C), can be used.

The skilled person will easily recognize the fiber (F) which fits best its composition and encompassed utility. Generally, the fiber (F) is chosen depending on its chemical nature, its length and diameter.

Non limitative examples of suitable fibers include glass fibers, asbestos, graphitic carbon fibers some of them having possibly a graphite content of at least 99%, amorphous carbon fibers, pitch-based carbon fibers, PAN-based carbon fibers, synthetic polymeric fibers, aluminum fibers, aluminum silicate fibers, oxide of metals of such aluminum fibers, titanium fibers, magnesium fibers, rock wool fibers, steel fibers, silicon carbide fibers, boron fibers, and mixtures thereof.

Preferably, the fiber (F) is chosen from glass fibers and carbon fibers. Carbon fibers, especially carbon fibers having a graphite content of at least 99%, are particularly efficient as anti-friction, anti-wear additive.

The fiber (F) has often a diameter preferably between 1 µm and 50 µm. Its length is often between 50 µm and 50 mm.

The fiber (F) is preferably formulated with a high temperature sizing, since said high temperature sizing provides superior interfacial adhesion with polymers that require generally to be processed at high temperatures.

The polymer composition (C) may further comprise at least one anti-friction and/or anti-wear non fibrous, non polymeric additive, generally in a total weight amount which does not exceed 15%, based on the total weight of the polymer composition (C). Suitable anti-friction and/or anti-wear non fibrous, non polymeric additives include graphite powder, molybdenum disulfide, lead, lead oxide, zinc oxide, zinc borate, titanium dioxide, and mixtures thereof. The total weight amount of the anti-friction and/or anti-wear non fibrous, non polymeric additive may be of at least 1%, 2%, 3% or 5%, based on the total weight of the polymer composition (C); besides, it may be of at most 10% or 7%.

The polymer composition (C) may further comprise at least one polymer (P5), other than the polymers (P1) to (P4). The total weight amount of the polymer (P5), based on the total weight of the polymer composition (C), is generally below 30%; the total weight amount of the polymer (P5), based on the total weight of the polymer composition (C), may be of at most 25%, 20%, 15% or 10%. Besides, it may be of at least 1%, 2%, 3%, 5% or 10%, based on the total weight of the polymer composition (C).

Expressed otherwise, the total weight of polymer (P5), based on the total weight of the polymers of the polymer composition (C) is also generally below 30%; the total weight amount of the polymer (P5), based on the total weight of the polymers of the polymer composition (C), may be of at most 25%, 20%, 15% or 10%, and of at least 1%, 2%, 3%, 5%, or 10%. Such additional polymer (P5) may be useful notably for tuning finely the properties of the polymer composition (C) with the requirements of the layer (L). The polymer (P5) may be selected from a first group consisting of poly(phenylene sulfide)s, wholly aromatic polyesters, polyphthalamides, and polyamides obtained by the polycondensation reaction of meta-xylylene diamine with an aliphatic diacid, and mixtures thereof. The polymer (P5) may also be selected from another group consisting of certain amorphous polymers, in particular polycarbonates.

The polymer composition (C) may further contain conventional ingredients of poly(aryl ether ketone) and per(halo) fluoropolymer compositions, including lubricating agents, heat stabilizers, anti-static agents, organic and/or inorganic pigments, carbon black, acid scavengers, such as MgO, stabilizers, i.e., metal oxides and sulfides such as zinc oxide and zinc sulfide, antioxidants, flame retardants and smoke-suppressing agents.

The polymer composition (C) is advantageously prepared by any conventional mixing method. A certain method ($m_1$), to which the preference is usually not given, comprises introducing the poly(aryl ether ketone) (P1) and the per(halo) fluoropolymer (P2) through separate feeders in an extruder (accordingly, no dry-mixing of the poly(aryl ether ketone) (P1) with the per(halo)fluoropolymer (P2) is operated), then extruding the poly(aryl ether ketone) (P1) and the per(halo) fluoropolymer into strands, and chopping the strands into pellets.

Another method ($m_2$), to which the preference is usually given, comprises:
  providing the poly(aryl ether ketone) (P1) in powder form and/or in granular form;
  providing the per(halo)fluoropolymer (P2) in powder form and/or in granular form;
  dry-mixing at least part of the poly(aryl ether ketone) (P1) with at least part of the per(halo)fluoropolymer (P2), so as to form a mixture (M12);
  introducing the mixture (M12) into an extruder through a feeder (F12);
  introducing the non-dry-mixed part of the poly(aryl ether ketone) (P1), if any, into the extruder through a feeder (F1) other than the feeder (F12);
  introducing the non-dry-mixed part of the per(halo)fluoropolymer (P2), if any, into the extruder through a feeder (F2) other than the feeders (F1) and (F12);
  extruding the polymer composition (C) into strands, and chopping the strands into pellets.

In accordance with said preferred method ($m_2$):
  the poly(aryl ether ketone) (P1) is preferably provided in powder form;
  the per(halo)fluoropolymer (P2) is preferably provided in powder form;
  the dry-mixing is preferably achieved using a mechanical blender;
  the dry-mixing is preferably achieved by tumble blending, for example in a steel drum forming part of a mechanical blender; the tumble blending takes generally place for at least 1 min, preferably at least 5 min, more preferably at least 10 min, and still more preferably at least 20 min;
  concerning the amounts of dry-mixed poly(aryl ether ketone) (P1) and dry-mixed per(halo)fluoropolymer (P2):
    usually, from 5 wt. % to 100 wt. % of the poly(aryl ether ketone) (P1), based on the total weight of the poly(aryl ether ketone) (P1), are dry-mixed, e.g. tumble blended, with from 5 wt. % to 100 wt. % of the per(halo)fluoropolymer (P2), based on the total weight of the per(halo)fluoropolymer (P2), so as to form the mixture (M12);
    in a first preferred embodiment, from 50 wt. % to 100 wt. % of the poly(aryl ether ketone) (P1), based on the total weight of the poly(aryl ether ketone) (P1), are dry-mixed, e.g. tumble blended, with from 50 wt. % to 100 wt. % of the per(halo)fluoropolymer (P2), based on the total weight of the per(halo)fluoropolymer (P2), so as to form the mixture (M12);
    more preferably, from 90 wt. % to 100 wt. % of the poly(aryl ether ketone) (P1), based on the total weight of the poly(aryl ether ketone) (P1), are dry-mixed, e.g. tumble blended, with from 90 wt. % to 100 wt. % of the per(halo)fluoropolymer (P2), based on the total weight of the per(halo)fluoropolymer (P2), so as to form the mixture (M12);
    still more preferably, the poly(aryl ether ketone) (P1) is dry-mixed, e.g. tumble blended, with the per(halo)fluoropolymer (P2), i.e. the whole poly(aryl ether ketone) (P1) and the whole per(halo)fluoropolymer (P2) are dry-mixed with each other; still otherwise said, there is no non-dry-mixed poly(aryl ether ketone) (P1) and there is no non-dry-mixed per(halo)fluoropolymer (P2);
    in another preferred embodiment, which is generally well suited when the total weight of the poly(aryl ether ketone) (P1), based on the total weight of the poly(aryl ether ketone) (P1) and the per(halo)fluoropolymer (P2), is above 70% (and especially when it is of at least 80% or of at least 85%), from 5 wt. % to 95 wt. % of the poly(aryl ether ketone) (P1), based on the total weight of the poly(aryl ether ketone) (P1), are dry-mixed, e.g. tumble blended, with from 50 wt. % to 100 wt. % of the per(halo)fluoropolymer (P2), based on the total weight of the per(halo)fluoropolymer (P2), so as to form the mixture (M12);

more preferably, from 10 wt. % to 50 wt. % of the poly(aryl ether ketone) (P1), based on the total weight of the poly(aryl ether ketone) (P1), are dry-mixed, e.g. tumble blended, with from 90 wt. % to 100 wt. % of the per(halo)fluoropolymer (P2), based on the total weight of the per(halo)fluoropolymer (P2), so as to form the mixture (M12);

still more preferably, from 15 wt. % to 35 wt. % of the poly(aryl ether ketone) (P1), based on the total weight of the poly(aryl ether ketone) (P1), are dry-mixed, e.g. tumble blended, with the per(halo)fluoropolymer (P2) [understand: with the whole per(halo)fluoropolymer (P2)], so as to form the mixture (M12); in the present case, there thus is no non-dry-mixed per (halo)fluoropolymer (P2).

The preferred method ($m_2$) for preparing the polymer composition (C) used for manufacturing the polymer layer (L) of the flexible pipe (fP) is not only beneficial when a polymer layer of a flexible pipe is indeed manufactured from the polymer composition (C), but also when the polymer composition (C) is used for the manufacture of many other shaped articles, in particular when it is used for the manufacture of essentially at most two-dimensional articles such as films, fibers and coatings. Hence, a particular aspect of the present invention is directed to a method for preparing a polymer composition (C) suitable for the manufacture of at least one polymer layer (L) of a flexible pipe (fP) (hereinafter, the "invented method ($m_{inv}$)"), said polymer composition (C) comprising:

at least one poly(aryl ether ketone) (P1), and
at least one per(halo)fluoropolymer (P2), and
optionally at least one polyarylene (P3), and
optionally at least one poly(aryl ether sulfone) (P4), wherein, if the polyarylene (P3) is present, the total weight of the poly(aryl ether ketone) (P1), based on the total weight of the polymer composition (C) is above 50%, and wherein, if the poly(aryl ether sulfone) (P4) is present, the total weight of the poly(aryl ether sulfone) (P4) over the total weight of the poly(aryl ether ketone) (P1) ratio is below 1, said method comprising:

providing the poly(aryl ether ketone) (P1) in powder form and/or in granular form;
providing the per(halo)fluoropolymer (P2) in powder form and/or in granular form;
dry-mixing at least part of the poly(aryl ether ketone) (P1) with at least part of the per(halo)fluoropolymer (P2), so as to form a mixture (M12);
introducing the mixture (M12) into an extruder through a feeder (F12);
introducing the non-dry-mixed part of the poly(aryl ether ketone) (P1), if any, into the extruder through a feeder (F1) other than the feeder (F12);
introducing the non-dry-mixed part of the per(halo)fluoropolymer (P2), if any, into the extruder through a feeder (F2) other than the feeders (F1) and (F12);
extruding the polymer composition (C) into strands, and chopping the strands into pellets.

Obviously, any details and preferences related to the method ($m_2$), including any details and preferences on the polymer composition (C) itself, can be applied, mutatis mutandis, to the invented method ($m_{inv}$) in accordance with said particular aspect of the present invention.

Without being bound by any theory, the Applicant believes that the improved properties exhibited by the polymer composition (C), by the polymer layer (L) and, at the end, by the flexible pipe (fP), when the polymer composition (C) is prepared by the invented method ($m_{inv}$), result from the fact that said invented method ($m_{inv}$), when compared to other methods such as method ($m_1$), allows for a more homogeneous dispersion of the per(halo)fluoropolymer (P2) in the poly(aryl ether ketone) (P1) when the poly(aryl ether ketone) (P1) forms the matrix of the polymer composition (C), and, reciprocally, for a more homogeneous dispersion of the poly(aryl ether ketone) (P1) in the per(halo)fluoropolymer (P2) when the per(halo)fluoropolymer (P2) forms the matrix of the polymer composition. Hence, still another particular aspect of the present invention is directed to a polymer composition suitable for the manufacture of at least one polymer layer (L) of a flexible pipe (fP) [hereinafter, the invented polymer composition ($C_{inv}$)], said polymer composition comprising:

at least one poly(aryl ether ketone) (P1), and
at least one per(halo)fluoropolymer (P2), and
optionally at least one polyarylene (P3), and
optionally at least one poly(aryl ether sulfone) (P4), wherein, if the polyarylene (P3) is present, the weight of the poly(aryl ether ketone) (P1), based on the total weight of the polymer composition, is above 50%, and wherein, if the poly(aryl ether sulfone) (P4) is present, the weight of the poly(aryl ether sulfone) (P4) over the total weight of the poly(aryl ether ketone) (P1) ratio is below 1, and wherein the poly(aryl ether ketone) (P1) and the per(halo)fluoropolymer (P2) are distributed in a substantially homogenous manner in the polymer composition.

Preferably, the poly(aryl ether ketone) (P1) and the per (halo)fluoropolymer (P2) are distributed in an essentially homogenous manner in the polymer composition ($C_{inv}$). More preferably, the poly(aryl ether ketone) (P1) and the per(halo)fluoropolymer (P2) are distributed homogeneously in the polymer composition ($C_{inv}$).

The homogeneity of the distribution of the poly(aryl ether ketone) (P1) and of the per(halo)fluoropolymer (P2) in the polymer composition ($C_{inv}$), is typically assessed at a microscopic scale. To do so, one or more microscope(s) is (are) generally used, and one or more hard print photograph(s) is (are) advantageously taken from the images observed with the microscope(s). One, two, three or more photographs can be taken at a given magnification. Preferably, hard print photographs are taken at different magnifications, ranging usually from about 10× to about 10,000×. An optical microscope equipped with light polarization facilities, such the optical microscopes commercialized by WILD, is advantageously used to cover the lowest magnifications, i.e. typically from about 10× to about 125×; WILD microscopes are usually not equipped with phase contrast facilities. Other optical microscopes, which are equipped with phase contrast facilities and with a CCD camera, such as a Reichart-Jung™ Polyvar optical microscope, allow for intrinsic magnifications ranging from 10× to 40×, which, upon acquisition of the images by the CCD camera and printing of the hard print photographs (2 images by page), results in final magnifications on the hard print photographs ranging from about 315× to about 1,250×; in polarized light mode, hard print photographs having a magnification as low as about 125× can further be obtained using the same Reichart-Jung™ Polyvar optical microscope or the like. A transmission electronic microscope, such as a ZEISS™ EM910 microscope, is advantageously used for the highest magnifications; when equipped respectively with a 100-mesh grid or a 300 mesh grid, this one allows for a magnification on the negatives of the photographs as low as about 400× or about 700×, corresponding to magnifications on the hard print copies of respectively about 1,200× or about 2,100×. Of course, a transmission electronic microscope, such as the ZEISS™ EM910 microscope, is also suitably used for higher magnifications, here usually up to about 10,000× on the hard prints (but hard print photographs with still higher magnifications, e.g. up to about 25,000× or 50,000×, can be further taken when useful). Hard print photographs are preferably taken at 2 different magnifications or more, preferably at 4 different magnifications or more, still more preferably at 6 different magnifications or more; each magnification differs preferably from the other ones by a factor of at least 2, possibly of at least 3 or of at least 5.

Obviously, any details and preferences related to the polymer composition (C) used for manufacturing the polymer layer (L) of the flexible pipe (fP) can be applied, mutatis mutandis, to the invented polymer composition ($C_{inv}$) in accordance with said other particular aspect of the present invention. Reciprocally, the polymer composition (C) possesses advantageously all the attributes of the polymer composition ($C_{inv}$); then, for example, the poly(aryl ether ketone) (P1) and the per(halo)fluoropolymer (P2) are advantageously distributed in a substantially homogenous manner in the polymer composition (C).

Example of Preparation of a Polymer Composition (C)

KetaSpire® KT-820P PEEK is a low melt flow neat polyetheretherketone homopolymer commercially available from SOLVAY ADVANCED POLYMERS, L.L.C.

Polymist® F5A PTFE is a non fibrillating polytetrafluoroethylene commercially available from SOLVAY SOLEXIS, Inc.

90 pbw (parts by weight) of KetaSpire® KT-820P PEEK and 10 pbw (parts by weight) of Polymist® F5A PTFE were tumble blended in a steel drum for 30 minutes prior to feeding to an extruder.

The extruder was a Coperion ZSK-40 twin screw co-rotating intermeshing extruder having 12 barrel sections for an L/D (length over diameter ratio) equal to 48. Vacuum venting was at barrel section 10.

The compounding conditions of the PEEK/PTFE 90/10 blend are detailed in Table 1.

TABLE 1

|  | Set Point (° C.) | Actual Readings |
|---|---|---|
| Barrel 1 temperature | No Heat | — |
| Barrel 2 temperature | 340 | 246 |
| Barrel 3 temperature | 350 | 335 |
| Barrel 4 temperature | 350 | 329 |
| Barrel 5 temperature | 350 | 347 |
| Barrel 6 temperature | 350 | 350 |
| Barrel 7 temperature | 350 | 351 |
| Barrel 8 temperature | 350 | 348 |
| Barrel 9 temperature | 350 | 350 |
| Barrel 10 temperature | 355 | 354 |
| Barrel 11 temperature | 355 | 355 |
| Barrel 12 temperature | 360 | 362 |
| Die adapter temperature | 365 | 360 |
| Melt temperature, handheld probe (° C.) | — | 405 |
| Die preassure (psi) | — | 159 |
| Extruder torque (%) | — | 67 |
| Screw speed (rpm) | 200 | 200 |
| Vacuum (in mm Hg) | — | 27 |
| Throughput rate | 125 | 125 |

Properties of the so-compounded blend were compared to those exhibited by the lot of neat KetaSpire® KT-820P PEEK that was used to prepare the blend.

The mechanical properties were tested according to ASTM standards using 1/8 inch thick test specimens. For tensile testing, 8.5 inch long Type I specimens were employed. The various ASTM tests were used:

- as concerns the tensile strength, modulus, yield and break elongations: ASTM D 638;
- as concerns the flexural strength and modulus: ASTM D 790;
- as concerns the notched Izod impact: ASTM D 256;
- as concerns the no-notch Izod impact: ASTM D 4812.

The heat deflection temperature (HDT) was measured in accordance with ASTM D 648. For HDT testing, the test specimens were annealed at 200° C. for 2 hours prior to testing to assure that the samples were fully crystallized and free of molded-in stresses.

The specific gravity was measured in accordance with ASTM D 792.

The results for the above listed properties are reported in Table 2.

Figure 3:
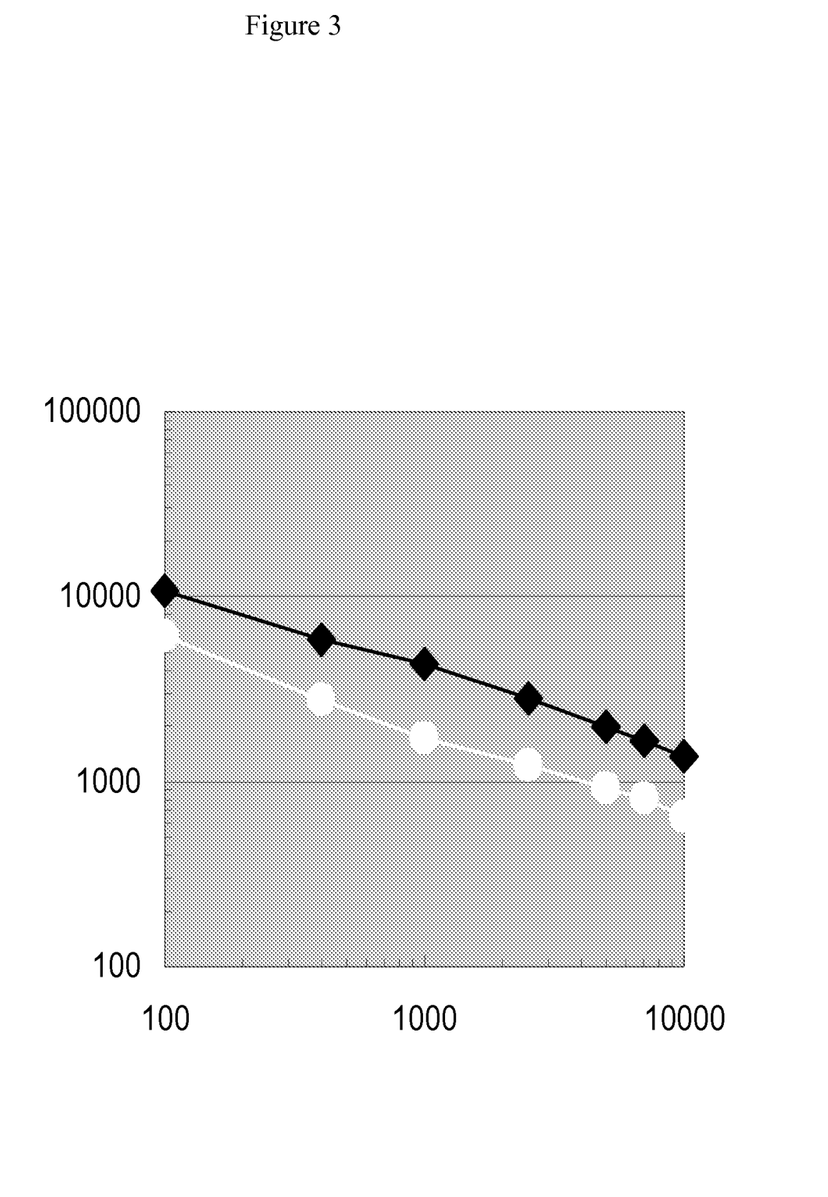
FIG. 3 represents the measured melt viscosity at 400° C. with respect to various shear rates of an example of a polymer composition (C) which is a compounded blend (white circles) of a polyetheretherketone homopolymer (KetaSpire® KT-820P PEEK) and a non fibrillating polytetrafluoroethylene (Polymist® F5A PTFE) compared to that of the same neat polyetheretherketone homopolymer (black rhombs).

The melt viscosity was measured at 400° C. and various shear rates ranging from 100 s$^{-1}$ to 10,000 s$^{-1}$, in accordance with ASTM method D 3835. The results are presented in FIG. 3:

- the vertical axis is for the melt viscosity measurements, expressed in poises;
- the horizontal axis is for the shear rate, expressed in s$^{-1}$;
- the black line and rhombs represent the melt viscosity of the neat KetaSpire® KT-820P PEEK control;
- the white line and circles represent the melt viscosity of the KetaSpire® KT-820P PEEK/Polymist® F5A PTFE 90/10 blend.

The melt viscosity at 400° C. and 1,000 s$^{-1}$ is further reported in Table 2 for the Reader's convenience.

TABLE 2

| Samples<br>Properties | KetaSpire® KT-820P PEEK 100 pbw (Control) | KetaSpire® KT-820P PEEK 90 pbw Polymist® F5A PTFE 10 pbw |
|---|---|---|
| Tensile yield strength (psi) | 13800 | 12700 |
| Tensile modulus (Ksi) | 547 | 519 |
| Tensile yield elongation (%) | 5.1 | 5.2 |
| Tensile elongation at break (%) | 20-30 | 57 |
| Flexural strength (psi) | 21100 | 19400 |
| Flexural modulus (Ksi) | 538 | 510 |
| Notched Izod (ft-lb/in) | 1.5 | 3.2 |
| No-Notch Izod (ft-lb/in) | No Break | No Break |
| HDT (° C.) | 156 | 155 |
| Specific Gravity | 1.30 | 1.349 |
| Melt viscosity at 400° C. and 1000 s$^{-1}$(kPa-s) | 0.44 | 0.17 |

The PEEK/PTFE 90:10 blend exhibited increased ductility, increased impact resistance and much lower melt viscosity than the neat PEEK control. Notably for these reasons, it is especially well suited for the manufacture of the at least one polymer layer (L) comprised in the flexible pipe (fP) in accordance with the present invention.

The Flexible Pipe (fP)

The flexible pipe of the present invention [flexible pipe (fP)] is advantageously tubular.

The flexible pipe (fP) is suitable for transporting hydrocarbons, in particular transporting crude oil and/or natural gas. However, it may also be used advantageously for transporting fluids other than hydrocarbons, including but not limited to as acids, alcohols, ketones, and corrosive vapors and gases.

The flexible pipe (fP) generally comprises a hollow circular section, inside which a fluid, such as the hydrocarbon, can be transported. Thus, a particular aspect of the present invention is directed to a flexible pipe (fP) comprising a hollow circular section, through which a fluid is effectively being transported.

The flexible pipe (fP) comprises generally a plurality of layers, such as metal layers and polymer layers. Preferably, at least at some of the layers of the flexible pipe (fP) are independent from each other. Very preferably, all the layers of the flexible pipe (fP) are independent from each other. Such independent, un-bonded layers are to a certain extent able to move relative to one another so as to allow the flexible pipe (fP) to bend.

The flexible pipe (fP) may comprise one or more polymer layers (L).

The flexible pipe (fP) may comprise a polymer layer (L) which is the innermost layer thereof (that layer susceptible of being in deep contact with the fluid to be transported, e.g. hydrocarbon, when drilling offshore).

The flexible pipe (fP) may comprise a polymer layer (L) which is the outermost layer thereof (that layer susceptible of being in deep contact with the external environment through which the flexible pipe passes, such as sea water, when drilling offshore).

The flexible pipe (fP) may comprise at least one polymer layer (L) which is an intermediate layer thereof. The flexible pipe (fP) may comprise one, two, three, four, or even much more intermediate polymer layers; in normal working conditions of the flexible pipe (fP), intermediate layers are neither susceptible of being in deep contact with the fluid to be transported, nor with the external environment.

In a preferred embodiment, the flexible pipe (fP) comprises at least two metal armor plies separated by an antiwear polymer layer (L). Each of said plies is preferably produced by helically winding a longitudinal metal element. Besides, said antiwear polymer layer (L) separating the at least two metal armor plies is preferably produced by helically winding a tape composed of the polymer composition (C).

In another preferred embodiment, the flexible pipe (fP) comprises a pressure vault and a metal armor ply separated by an antiwear polymer layer (L). Said pressure vault is preferably produced by helically winding a profiled metal wire with a short pitch. Besides, said antiwear polymer layer (L) separating the pressure vault and the metal armor ply is also preferably produced by helically winding a tape composed of the polymer composition (C).

The above two embodiments can be combined together.

According to another aspect of the same embodiment, the invention provides a preferred method for producing the flexible pipe (fP), said method being of the type in which at least two longitudinal metal elements are wound helically in sequence so as to form two armor plies, tapes composed of the polymer composition (C) being helically wound between said armor plies so as to form the layer (L), said layer (L) being an antiwear layer. Furthermore, and particularly advantageously said polymer composition (C) is extruded, thereby simplifying the processing of the material and in particular allowing long thin sheets to be formed. Preferably, said long thin sheets are slit so as to obtain said tapes so that they are in a condition for installing them on a pipe production device. Moreover, said tapes are advantageously butted together by ultrasonic welding.

Other features and advantages of the invention will emerge upon reading the following description of particular embodiments of the invention, given by way of indication but implying no limitation, with reference to the appended drawings in which the figures are partial schematic views in perspective of various flexible tubular pipes (fP) according to the invention.

Figure 1:
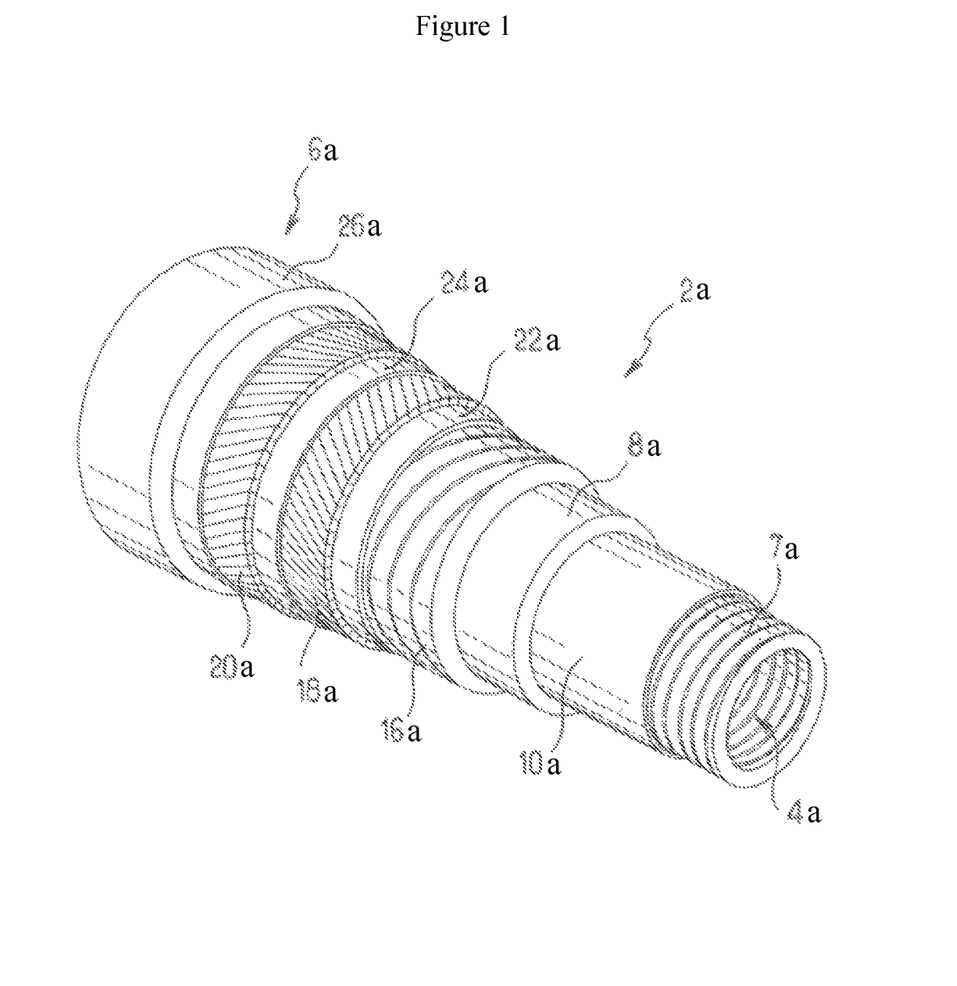
FIG. 1 shows, in part, a portion of a flexible pipe in accordance with the present invention, which comprises intermediate antiwear layers (L) composed of a polymer composition (C)

FIG. 1 of the present patent title shows, in part, a portion of a flexible pipe 2a in accordance with the present invention, which comprises intermediate antiwear layers (L) composed of a polymer composition (C). The flexible pipe, from the inside 4a to the outside 6a: a flexible metal tube or carcass 7a, produced by a short-pitch helical winding of metal wires or strips; an internal sealing sheath or pressure sheath 8a placed around the carcass 7a; a covering layer 10a of plastic, between the carcass 7a and the pressure sheath 8a; a pressure vault 16a formed from a short-pitch winding around the pressure sheath 8a of an interlocked profiled metal wire intended to take up the internal compressive forces; a first tensile armor ply 18a and a second tensile armor ply 20a. These armor plies are formed from wires wound with a long pitch and intended to take up the longitudinal tensile forces to which the flexible pipe 2a may be subjected. Furthermore, the pipe 2a has a first helical winding 22a of a tape of plastic, so as to form a first antiwear layer between the pressure vault 16a and the first armor ply 18a, and a second helical winding 24a of a tape of plastic, to form a second antiwear layer between the two tensile armor plies 18a, 20a. Thanks to these two antiwear layers, the armor plies 18a, 20a and the pressure vault 16a are not, respectively and directly in contact with one another so that, when the flexible pipe 2a bends, there is no wear due to the rubbing of the metal armor wires on one another. Antiwear layers 22a and 24a are composed of a polymer composition falling under the general definition of polymer composition (C) [layers (L)]. Antiwear layers 22a and 24a may be strictly identical in nature, or they may be different, with the proviso that they all fall under the general definition of polymer composition (C). Further, the covering layer 10a may also advantageously be composed of a polymer composition falling under the general definition of polymer composition (C). To a lesser extent, this is also true for the pressure sheath 8a, which might also be composed of a polymer composition falling under the general definition of polymer composition (C), e.g. a polymer blend composed of 80 wt. % of polyetheretherketone homopolymer and 20 wt. % of polytetrafluoroethylene homopolymer. According to one particular embodiment of the invention, the polymer composition (C) is extruded through a wide sheet die having a width for example of 1.00 meter, so as to obtain a long sheet with a thickness of e.g. 1.5 mm and a width of approximately 1.00 meter. Simultaneously, after being cooled, the sheet is wound so as to produce a mother reel containing a few hundred meters. Next, the sheet is slit to obtain tapes ranging typically from 50 to 100 mm in width, which are rewound onto daughter reels, to be installed on a conventional tape-winding device mounted online with a spiraler or armorer for laying the metal armor wires. Consequently, there is no need to modify or adapt said existing tape-winding device in order to install these plastic tapes thereon.

According to a preferred method in accordance with the invention, a profiled wire is firstly wound helically with a short pitch so as to produce the pressure vault 16a. Next, a plastic tape, of the aforementioned type composed of the polymer composition (C), is helically wound so as to produce the first winding 22a on the pressure vault 16a. This plastic tape is generally applied with a tension of around 100 to 150 daN, which induces an average stress on the tape of around 10 to 20 MPa. Furthermore, and according to one particularly advantageous feature of the invention, the plastic tapes are butted together, when this is necessary, by ultrasonic spot welding. To do this, the two ends of the tape to be butted are brought together, one on top of the other, and a suitable sonotrode is applied to the two ends.

Next, the first tensile armor ply 18*a* is formed on the first winding 22*a* and a plastic tape is again wound helically onto the tensile armor ply 18*a*, to form the second winding 24*a*.

Finally, the second tensile armor ply 20*a* is applied on the second winding 24*a* and then covered with a protective sheath 26*a*.

However, other plastic or metallic layers can be incorporated into the flexible pipe 2*a* upstream of the pressure vault 16*a* or downstream of the second tensile armor ply 20*a*.

Figure 2:
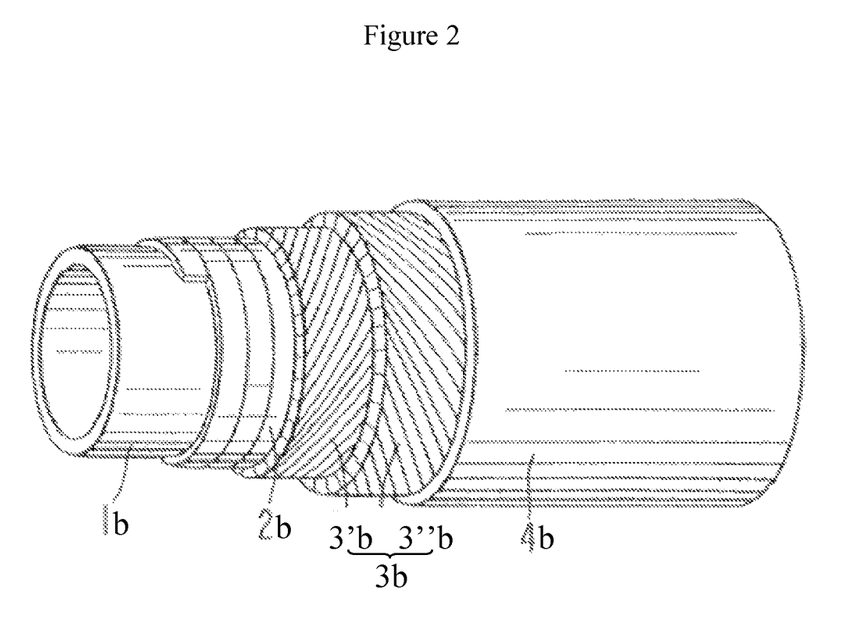
FIG. 2 shows, in part, a portion of another flexible pipe in accordance with the present invention, the innermost layer of which and/or the outermost layer of which is composed of a polymer composition (C)

FIG. 2 shows, in part, a portion of another flexible pipe in accordance with the present invention, the innermost layer of which and/or the outermost layer of which is composed of a polymer composition (C).

According to FIG. 2, an inner pipe 1*b* of plastic is covered with a pressure-resistant armor 2*b* which, in the example illustrated, is formed by winding a preformed shape wound helically at an angle exceeding about 85° C., for example, relative to the pipe axis. The inner pipe 1*b* and pressure resistant armor 2*b* are covered with a traction-resistant armor including two cross-layers 3*b* (3'*b*, 3"*b*) fashioned of shapes or elongated elements helically wound in two layers having opposite pitches. The winding angle of the shapes or elongated elements is usually between 20° C. and 50° C. relative to the pipe axis. An outer sheath 4*b*, made of plastic, covers the above assembly thus formed. In accordance with the present invention, at least one of the inner pipe 1*b* and the outer sheath 4*b* is composed of a polymer composition falling under the general definition of polymer composition (C), e.g. a polymer blend composed of 80 wt. % of polyetheretherketone homopolymer and 20 wt. % of polytetrafluoroethylene homopolymer.

However, other plastic or metallic layers can be incorporated into the flexible pipe of FIG. 2. In particular, this flexible pipe may advantageously further include two antiwear layers 5*b* and 6*b* (not represented on FIG. 2), respectively interposed between the pressure-resistant armor 2*b* and the cross-layer 3'*b* of the traction-resistant armor 3*b* on one hand, and between the cross-layers 3'*b* and 3"*b* of the traction-resistant armor 3*b* on the other hand.

The invention claimed is:

1. A flexible pipe, said flexible pipe comprising several layers arranged in a modular construction wherein at least some of the layers are independent and un-bonded from each other, at least one of said layers being a polymer layer (L) comprising a polymer composition (C) comprising:
   at least one poly(aryl ether ketone) (P1),
   at least one per(halo)fluoropolymer (P2), and
   optionally at least one polyarylene (P3), and
   optionally at least one poly(aryl ether sulfone) (P4),
   wherein the total weight of the poly(aryl ether ketone) (P1), based on the total weight of the poly(aryl ether ketone) (P1) and the per(halo)fluoropolymer (P2), is above 65% and of at most 99%,
   wherein a total weight of the per(halo)fluoropolymer (P2), based on a total weight of the polymer composition (C), is above 1% and below 30%,
   wherein, if the polyarylene (P3) is present, the total weight of the poly(aryl ether ketone) (P1), based on the total weight of the polymer composition (C), is above 50%,
   wherein, if the poly(aryl ether sulfone) (P4) is present, the total weight of the poly(aryl ether sulfone) (P4) over the total weight of the poly(aryl ether ketone) (P1) ratio is below 1,
   and wherein the poly(aryl ether ketone) (P1) has a content of more than 50 wt % of recurring units of any of formulae (I) through (V):

wherein
each Ar is independently phenylene, biphenylene, or naphthylene,
each X is independently O, C(=O), or a direct bond,
n is an integer of from 0 to 3,
b, c, d, and e are 0 or 1, and
a is an integer of from 1 to 4.

2. The flexible pipe according to claim 1, wherein the polymer composition (C) is essentially free of any polyarylene and poly(aryl ether sulfone).

3. The flexible pipe according to claim 1, wherein the total weight of the poly(aryl ether ketone) (P1) and the per(halo)fluoropolymer (P2), based on the total weight of the polymer composition (C), is above 50%.

4. The flexible pipe according to claim 1, wherein the polymer composition (C) consists essentially of the poly(aryl ether ketone) (P1) and the per(halo)fluoropolymer (P2).

5. The flexible pipe according to claim 1, wherein the poly(aryl ether ketone) (P1) is a polyetheretherketone.

6. The flexible pipe according to claim 1, wherein the per(halo)fluoropolymer (P2) is a polytetrafluoroethylene.

7. The flexible pipe according to claim 1, comprising a hollow circular section.

8. The flexible pipe according to claim 1, comprising a hollow circular section, through which a fluid is being transported.

9. The flexible pipe according to claim 1, comprising at least one of said polymer layers (L) as an intermediate layer thereof.

10. The flexible pipe according to claim 1, wherein the polymer composition (C) is extruded.

11. The flexible pipe according to claim 1, wherein the polymer composition (C) comprises:
- at least one poly(aryl ether ketone) (P1),
- at least one per(halo)fluoropolymer (P2), and
- at least one polyarylene (P3).

12. The flexible pipe according to claim 1, wherein the polymer composition (C) comprises:
- at least one poly(aryl ether ketone) (P1),
- at least one per(halo)fluoropolymer (P2), and
- at least one poly(aryl ether sulfone) (P4).

13. The flexible pipe according to claim 1, wherein the polymer composition (C) comprises:
- at least one poly(aryl ether ketone) (P1),
- at least one per(halo)fluoropolymer (P2),
- at least one polyarylene (P3), and
- at least one poly(aryl ether sulfone) (P4).

14. The flexible pipe according to claim 1,
wherein the total weight of the poly(aryl ether ketone) (P1), based on the total weight of the poly(aryl ether ketone) (P1) and the per(halo)fluoropolymer (P2), is above 70% and of at most 90%,
wherein, if the polyarylene (P3) is present, the total weight of the poly(aryl ether ketone) (P1), based on the total weight of the polymer composition (C), is above 60%,
and wherein, if the poly(aryl ether sulfone) (P4) is present, the total weight of the poly(aryl ether sulfone) (P4) over the total weight of the poly(aryl ether ketone) (P1) ratio is below 0.8.

15. The flexible pipe according to claim 11,
wherein the total weight of the poly(aryl ether ketone) (P1), based on the total weight of the poly(aryl ether ketone) (P1) and the per(halo)fluoropolymer (P2), is above 70% and of at most 90%,
wherein the total weight of the poly(aryl ether ketone) (P1), based on the total weight of the polymer composition (C), is above 60%,
and wherein, if the poly(aryl ether sulfone) (P4) is present, the total weight of the poly(aryl ether sulfone) (P4) over the total weight of the poly(aryl ether ketone) (P1) ratio is below 0.8.

16. The flexible pipe according to claim 12,
wherein the total weight of the poly(aryl ether ketone) (P1), based on the total weight of the poly(aryl ether ketone) (P1) and the per(halo)fluoropolymer (P2), is above 70% and of at most 90%,
wherein, if the polyarylene (P3) is present, the total weight of the poly(aryl ether ketone) (P1), based on the total weight of the polymer composition (C), is above 60%,
and wherein the total weight of the poly(aryl ether sulfone) (P4) over the total weight of the poly(aryl ether ketone) (P1) ratio is below 0.8.

17. The flexible pipe according to claim 13,
wherein the total weight of the poly(aryl ether ketone) (P1), based on the total weight of the poly(aryl ether ketone) (P1) and the per(halo)fluoropolymer (P2), is above 70% and of at most 90%,
wherein the total weight of the poly(aryl ether ketone) (P1), based on the total weight of the polymer composition (C), is above 60%,
and wherein the total weight of the poly(aryl ether sulfone) (P4) over the total weight of the poly(aryl ether ketone) (P1) ratio is below 0.8.

18. The flexible pipe according to claim 1, wherein polymer layer (L) consists of said polymer composition (C).

19. The flexible pipe according to claim 1, comprising at least two polymer layers (L).

20. The flexible pipe according to claim 19, wherein each polymer layer (L) independently consists of said polymer composition (C).

21. The flexible pipe according to claim 1, wherein the total weight of the per(halo)fluoropolymer (P2), based on the total weight of the polymer composition (C), is above 1% and below 20%.

* * * * *